Nov. 30, 1926.
P. P. BASTERREIX
STEERING WHEEL SWITCH
Filed July 21, 1925
1,609,104
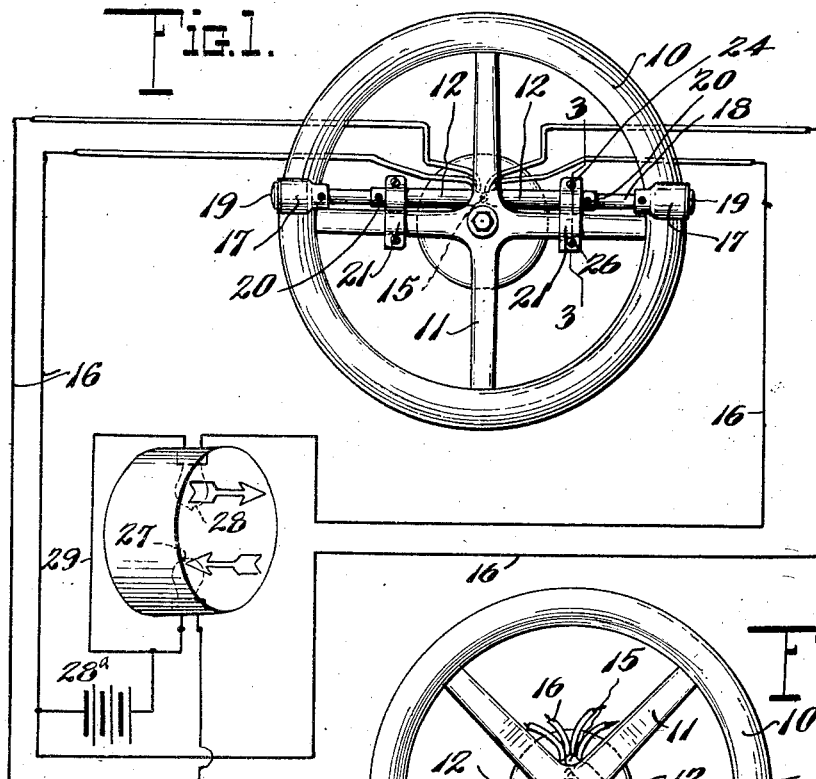
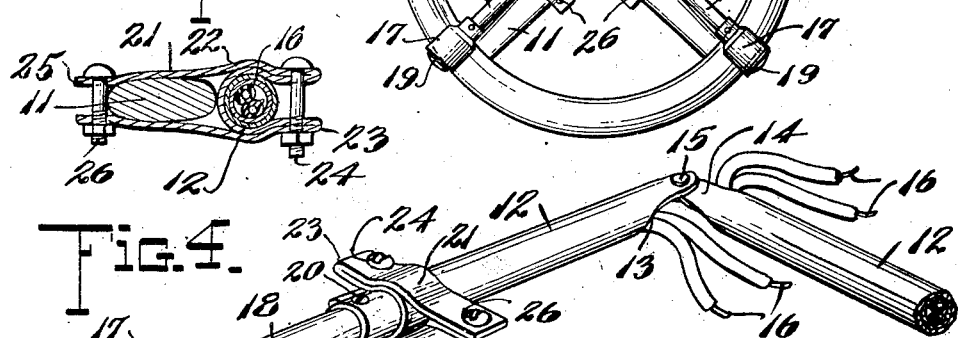

Patented Nov. 30, 1926.

1,609,104

UNITED STATES PATENT OFFICE.

PIERRE PAUL BASTERREIX, OF BUTTE, MONTANA.

STEERING-WHEEL SWITCH.

Application filed July 21, 1925. Serial No. 45,022.

This invention relates to a steering wheel switch, and particularly to a construction for disposing separate contacts relative to the effective showing of the device controlled thereby. This is particularly applicable to direction signals where the controlling switches therefor are located upon or adjacent to a steering wheel and the contact adjacent the left hand of the operator controls a corresponding signal as to direction of turning, while the opposite contact controls a signal for the other direction.

Many operators of automobiles are accustomed to grasp the steering wheel thereof at points substantially 180° distant, while others hold the wheel at its lower portion at points about 90° apart. The usual mounting for switches carried by the wheel is in fixed relation thereto and the driver must become accustomed to the exact location of the contact part which is not adjustable to suit the usual position of his hands upon the rim of the wheel when operating the vehicle. Such constructions also often require a special type of wheel and are not applicable to those in ordinary use so that they can be applied by an inexperienced person.

My invention presents a construction which is adapted for adjustable mounting upon the wheel both as to the diameter thereof to dispose the contacts at the rim convenient to the hands of the operator, and also adjustable circumferentially of the rim to locate such contacts at different distances from each other upon such rim. The construction is also adapted for application to the usual steering wheel by removable attachment to the spokes thereof and disposes the push buttons directly at or beneath the rim of the wheel in a most convenient position for operation.

The invention has for an object to provide a novel and improved construction comprising a plurality of conducting tubes provided for attachment to the spokes of a steering wheel and having push contacts at their free ends adjacent the periphery of said wheel.

Another object of the invention is to present a new construction wherein the conducting tubes are attachable to the usual construction of steering wheel and the push buttons or contacts telescopingly adjustable upon the tubes relative to the diameter of such wheel so that the attachment may be applied to a wide range of steering wheels.

A further object of the invention is to provide an improved form of clamp formed of a single piece of material bent upon itself to embrace the conducting tube at one end and having opposite free ends adapted to be clamped about the spoke of the steering wheel.

Other and further objects and advantages of the invention will be hereinafter set forth and the novel features thereof defined by the appended claims.

In the drawing:

Figure 1 is a plan of the invention applied with the electrical connections therefrom in diagram;

Figure 2 is a similar view of the wheel alone with a different adjustment of the contact members thereon;

Figure 3 is an enlarged section on the line 3—3 of Figure 2; and

Figure 4 is a detail perspective of the conducting tubes.

Like reference numerals designate corresponding parts throughout the several figures of the drawing.

The numeral 10 designates a steering wheel which may be of any desired construction or size and provided with the usual spokes 11, such wheel being secured to the steering post in the ordinary manner. Cooperating with these spokes are the conductor tubes 12 which are open at their inner ends 13 and there provided with pivoting lugs 14 connected by a suitable pivot 15. The conductors 16 for each of the circuits extend through these tubes and are electrically connected in the usual manner to the contact members 17 carried by the tubular shanks 18 and comprising push buttons 19 if so desired. These shanks are telescopingly mounted within the conductor tubes so as to be adjustable longitudinally and axially thereof, and are held at such adjustment by a securing device or screw 20.

The structure so far described comprises conducting tubes and contact members pivotally connected for adjustment toward and from each other, or from a position at substantially 180° apart to one of 90° apart, as in Fig. 2, in which case the tubes are secured to adjacent spokes.

Various means may be used for mounting these tubes upon the spokes and a preferred form is shown in Figure 3 and comprises the clamp or clasp 21 having at one end an inwardly bent curved portion 22 forming a socket to receive the tube 12 and also overturned free ends 23 adapted to be clamped by a securing device 24. The opposite free ends 25 of the clamp embrace the spoke 11 and are secured thereto by a clamping device 26.

The switch construction shown may be adapted for the control of any desired circuit arrangement but it is particularly adapted for use in connection with co-related direction signals such as shown in Figure 1. In such instance the electrical conductor 16 from one of the contacts is carried to a signal illuminating device 27 and a return line therefrom extends through the battery 28ª to the contact member upon the wheel. The line 16 from the opposite contact member extends to an illuminating lamp 28 having a line 29 connected to the battery and a return line 16 therefrom to the contact. Other arrangements of this electrical circuit may be made as found desirable.

The invention presents a simple, efficient, and economically constructed switch contact adapted for application as an attachment to a steering wheel and for adjustment both diagonally and circumferentially thereof to suit the convenience and usual position of the hands of the operator. These contacts are so located and connected that in indicating a left turn the similar hand of the driver is used and likewise with an opposite or right turn. Such adjustment is readily permitted by the pivotal connection between the sections of the conducting tubes and the further longitudinal adjustment of the push buttons thereon.

While the details of the invention have been specifically shown and described, changes and alterations may be made therein without departing from the spirit thereof as defined by the appended claims.

Having thus described my invention, what I claim as new and desire to secure by Letters Patent is:—

1. A steering wheel switch comprising oppositely disposed conducting tubes connected together for relative adjustment circumferentially of the wheel and extending radially from the post of such wheel, means for attachment of said tubes to the spokes of the wheel, and push contacts at the free ends of said tubes disposed adjacent the periphery of the wheel and having conductors therefrom within the tubes.

2. A steering wheel switch comprising opposite conducting tubes provided with means for attachment to the spokes of a steering wheel, means connecting the tubes together to permit circumferential adjustment thereof relative to the wheel rim, push contacts at the free ends of said tubes disposed adjacent the periphery of said wheel, and a telescoping tube carrying said push contacts and adjustably secured upon the conducting tubes.

3. In a steering wheel switch, opposite conducting tubes pivotally connected at their inner ends, means for supporting said tubes upon the spokes of a steering wheel, and push buttons carried by the free ends of said tubes.

4. In a steering wheel switch, opposite conducting tubes pivotally connected at their inner ends, means for supporting said tubes upon the spokes of a steering wheel, and push buttons carried by shanks telescoping into and secured upon said tubes.

5. In a steering wheel switch, opposite conducting tubes open at their inner ends and provided with lugs by which the tubes are pivotally connected together, means for adjusting said tubes circumferentially upon a steering wheel, and manually operable contact members carried by the outer ends of said tubes.

6. The combination with a steering wheel of oppositely disposed conducting tubes connected together and carried by the wheel radially of its post, and manually operable contact members upon the tubes, said tubes and members being movable circumferentially of the rim of said wheel toward and from each other for adjustment convenient to the position of the operator's hand.

In testimony whereof I affix my signature.

PIERRE PAUL BASTERREIX.